United States Patent
Ante et al.

(10) Patent No.: US 8,043,047 B2
(45) Date of Patent: Oct. 25, 2011

(54) COMPRESSOR CASING FOR AN EXHAUST GAS TURBOCHARGER

(75) Inventors: Johannes Ante, Regensbrug (DE); Markus Gilch, Mauern (DE)

(73) Assignee: Siemens VDO Automotive AG, Regensburg (DE)

(*) Notice: Subject to any disclaimer, the term of this patent is extended or adjusted under 35 U.S.C. 154(b) by 1063 days.

(21) Appl. No.: 11/887,053

(22) PCT Filed: Jan. 12, 2007

(86) PCT No.: PCT/EP2007/050278
§ 371 (c)(1), (2), (4) Date: Sep. 24, 2007

(87) PCT Pub. No.: WO2007/085535
PCT Pub. Date: Aug. 2, 2007

(65) Prior Publication Data
US 2009/0060716 A1    Mar. 5, 2009

(30) Foreign Application Priority Data
Jan. 25, 2006   (DE) .................. 10 2006 003 599

(51) Int. Cl.
*F01B 25/04* (2006.01)

(52) U.S. Cl. ..... 415/118; 415/200; 415/203; 415/214.1; 60/398; 60/608; 60/609; 29/888.024; 29/888.022

(58) Field of Classification Search .................. 415/118, 415/200, 203, 214.1, 215.1; 60/398, 607, 60/608; 29/88.02
See application file for complete search history.

(56) References Cited

U.S. PATENT DOCUMENTS

| | | | | |
|---|---|---|---|---|
| 4,482,303 A | * | 11/1984 | Acosta | ........................ 417/406 |
| 4,833,405 A | * | 5/1989 | Richards et al. | ......... 324/207.22 |
| 4,924,674 A | | 5/1990 | Hara et al. | |
| 5,403,150 A | * | 4/1995 | McEachern et al. | .......... 415/177 |
| 2005/0017709 A1 | | 1/2005 | Stolfus et al. | |
| 2005/0155349 A1 | | 7/2005 | Sugiura et al. | |
| 2007/0001664 A1 | | 1/2007 | Steinbrink et al. | |
| 2007/0186551 A1 | | 8/2007 | Ante et al. | |
| 2008/0292449 A1 | | 11/2008 | Lefevre | |

FOREIGN PATENT DOCUMENTS

| | | |
|---|---|---|
| DE | 102 60 042 | 7/2004 |
| DE | 10260042 | 7/2004 |
| DE | 10260042 A1 * | 7/2004 |
| DE | 10 2004 011 100 | 2/2005 |

(Continued)

OTHER PUBLICATIONS

Rempke, V.; Schmähl, M.: Mechanische Bauelemente und Baugruppen. 2., stark bearbeitete Auflage, Berlin VEB Verlag Technik, 1981, Seite 18.

(Continued)

*Primary Examiner* — Igor Kershteyn
(74) *Attorney, Agent, or Firm* — Cozen O'Connor

(57) ABSTRACT

A compressor casing for an exhaust gas turbocharger is disclosed. The exhaust gas turbocharger has a rotatable turboshaft, a compressor wheel mounted on the turboshaft, and a turbine wheel mounted on the turboshaft. The compressor casing includes a sensor for measuring a rotational speed of the turboshaft. The sensor is embedded in the compressor casing and forms an integral component of the compressor casing.

17 Claims, 4 Drawing Sheets

FOREIGN PATENT DOCUMENTS

| | | |
|---|---|---|
| DE | 10 2004 011 100 | 9/2005 |
| EP | 0 310 426 | 4/1989 |
| GB | 1 226 149 | 3/1971 |
| GB | 1226149 | 3/1971 |
| GB | 2084251 A * | 4/1982 |
| JP | 7-151629 | 6/1995 |
| JP | 2003097281 | 4/2003 |
| JP | 2005-201146 | 7/2005 |
| WO | WO 2005/012919 | 2/2005 |
| WO | WO 2005/124159 | 12/2005 |
| WO | WO 2006/005662 | 1/2006 |

OTHER PUBLICATIONS

Schrott K H: "Die neue Generation der MAN-B&W-Turbolader"; MTZ Motortechnische Zeitschrift, Vieweg Verlag, Wiesbaden, DE, Bd. 56, Nr. 10, Jan. 10, 1995, Seiten 596-601, XP 000532350, ISSN: 0024-8525, Seite 600, Abstaz 4.3—Absatz 4.4: Abbildung 7.

Volker Remper, Manfred Schmähl; Mechanische Bauelemente und Baugruppen; Wissensspeicher für die Berufsbildung; 1977; $2^{nd}$ revised edition 1981; cover sheets, p. 18; VEB Verlag Technik Berlin; former GDR.

Karl Heinz Schrott, Die neue Generation der MAN-B&W-Turbolader;MTZ Motortechnische Zeitschrift, Vieweg Verlag Wiesbaden, Oct. 1, 1995, pp. 596-601, ISSN 0024-8525; XP000532350.

Search Report dated May 4, 2007 for the underlying International Application No. PCT/EP2007/050278.

* cited by examiner

COMPRESSOR CASING FOR AN EXHAUST GAS TURBOCHARGER

CROSS-REFERENCE TO RELATED APPLICATIONS

This is a U.S. national stage of International Application No. PCT/EP2007/050278, filed on 12 Jan. 2007. Priority is claimed on Germany Application No. 10 2006 003 599.2, filed on 25 Jan. 2006.

BACKGROUND OF THE INVENTION

1. Field of the Invention
2. Description of the Related Art

The power generated by an internal combustion engine depends on the air mass and the fuel quantity which can be made available to the engine for combustion. In order to increase the power of an internal combustion engine, the quantity of combustion air and fuel supplied must be increased. In the case of a naturally aspirated engine, this power increase is achieved by an increase in swept volume or by increasing the engine speed. However, an increase in swept volume leads in principle to heavier engines of larger dimensions, which are therefore more expensive. The increase in engine speed entails considerable problems and disadvantages, especially in the case of relatively large internal combustion engines, and is limited for technical reasons.

A much-used technical solution for increasing the power of an internal combustion engine is boosting. This refers to precompression of the combustion air by an exhaust gas turbocharger or by means of a compressor mechanically driven by the engine. An exhaust gas turbocharger consists essentially of a flow compressor and a turbine which are connected by a common turboshaft and rotate at the same speed. The turbine converts the normally uselessly discharged energy of the exhaust gas into rotational energy and drives the compressor. The compressor aspirates fresh air and conveys the precompressed air to the individual cylinders of the engine. An increased quantity of fuel can be supplied to the larger air quantity in the cylinders, whereby the engine delivers more power. In addition, the combustion process is influenced favorably, so that the engine achieves better overall efficiency. Furthermore, the torque curve of an internal combustion engine boosted with a turbocharger can be configured extremely favorably. Existing naturally aspirated engines in series production by manufacturers can be significantly optimized by the use of an exhaust gas turbocharger without major interventions in engine design. Boosted internal combustion engines generally have a lower specific fuel consumption and lower pollutant emissions. Moreover, turbocharged engines are quieter than naturally aspirated engines of the same power because the exhaust gas turbocharger itself acts like an additional silencer.

For internal combustion engines with a wide operating speed range, for example, passenger car engines, a high boost pressure is required even at low engine speeds. For this purpose a boost pressure control valve, a so-called waste gate valve, is introduced with these turbochargers. Through the selection of a suitable turbine casing a high boost pressure is rapidly built up even at low engine speeds. The boost pressure control valve (waste gate valve) then limits the boost pressure to a constant value as engine speed rises. Alternatively, turbochargers with variable turbine geometry (VTG) are used. In these turbochargers the boost pressure is regulated by changing the turbine geometry.

With increased exhaust gas quantity, the maximum permissible speed of the combination of turbine wheel, compressor wheel and turboshaft, also referred to as the rotor of the turbocharger, may be exceeded. Impermissible exceeding of the speed of the rotor would destroy the latter, which is equivalent to total loss of the turbocharger. In particular modern, small turbochargers with significantly smaller turbine wheel and compressor wheel diameters, which have improved rotational acceleration behavior through a considerably lower mass moment of inertia, are affected by the problem of exceeding the permissible maximum rotational speed. Depending on the design of the turbocharger, exceeding of the rotational speed limit even by approximately 5% causes complete destruction of the turbocharger.

Boost pressure control valves which, according to the prior art, are activated by a signal resulting from the boost pressure generated, have proved effective for limiting rotational speed. If the boost pressure exceeds a predetermined threshold value, the boost pressure control valve opens and conducts a part of the exhaust gas mass flow past the turbine. Because of the reduced exhaust gas mass flow, the turbine absorbs less power and the compressor output is reduced proportionally. The boost pressure and the rotational speed of the turbine wheel and the compressor wheel are reduced. However, this regulation is relatively sluggish, because the pressure build-up in the event of the rotor exceeding a given speed occurs with a time offset. For this reason, regulation of turbocharger speed by monitoring boost pressure, especially in the high dynamic range (load change), must intervene by correspondingly early reduction of boost pressure, incurring a loss of efficiency.

SUMMARY OF THE INVENTION

It is therefore an object of the present invention to detect the rotational speed of the rotating parts (turbine wheel, compressor wheel, turboshaft) of an exhaust gas turbocharger in a manner which is inexpensive, reliable and exact.

This object is achieved according to the invention in that a sensor for measuring the rotational speed of the turboshaft is embedded in the compressor casing during the injection-molding, whereby the sensor is configured as a component integrated in the compressor casing itself. This has the advantage that no through-bores or recesses need to be worked into the compressor casing in order to position a rotational speed sensor. The rotational speed sensor is a component integrated in the compressor casing which does without any sealing or fixing material. This considerably simplifies the manufacture of the turbocharger, reduces manufacturing cost and contributes decisively to improved durability. Thermal stresses between the rotational speed sensor and the compressor casing are completely avoided because the sensor is fully embedded in the material of the compressor casing.

In a first configuration the compressor casing is made from a plastics material. Modern plastics materials withstand the temperatures occurring in the compressor of the turbocharger without difficulty, are light and inexpensive and can be processed using the injection-molding method. Because they have electrically insulating properties they are extremely well suited to surrounding the components of the sensor. The plastics material protects the sensor against external influences and holds it in a stable position in relation to the turboshaft.

Alternatively, the compressor casing is made from aluminum. Aluminum is also easily processed using the injection-molding method. The term injection-molding should be understood here to include methods such as die-casting or precision casting of metals. Metals such as aluminum are very temperature-resistant and dimensionally stable. If the sensor is surrounded by an insulating material, for example, plastics material, it can be embedded without difficulty in the aluminum compressor casing.

If the compressor casing consists of at least a first part and a second part, an advantageous material selection can be made whereby materials with the most favorable properties can be selected for the different parts. For example, the first part of the compressor casing may be made from aluminum or plastics material. The second part of the compressor casing may also be made optionally from aluminum or plastics material. According to the particular requirements, the different materials can be used optimally. It is also possible to use a plurality of different metal and plastics materials in the multi-part compressor casing.

In a next configuration, the sensor includes a sensor element and/or signal processing electronics and/or a magnet. The signal processing electronics can process the raw signal of the sensor element advantageously because it is located very close to the sensor element, so that external electromagnetic interferences can have little influence. In the signal processing electronics the raw signal may be amplified and also converted into a digital signal. The analog-to-digital conversion in the sensor makes it possible to supply directly standardized signals, so that the compressor casing with the sensor integrated therein can be used in different vehicles, provided the vehicles conform to this standard. The magnet in the sensor may be used to generate the magnetic field the variation of which is to be measured. The variation of the magnetic field is then effected by an element for varying the magnetic field which is preferably formed on the compressor end of the turboshaft.

In a development, the sensor element is in the form of a Hall sensor element. Hall sensor elements are very well suited to detecting variation of a magnetic field and can therefore be utilized very effectively for detecting rotational speed. Hall sensor elements are very inexpensive to purchase and can be used at temperatures up to approximately 160° C.

Alternatively, the sensor element is in the form of a magnetoresistive (MR) sensor element. MR sensor elements in their turn are well suited to detecting variation of a magnetic field and can be purchased at low cost.

In a next alternative configuration, the sensor element is in the form of an inductive sensor element. Inductive sensor elements are also extremely well suited to detecting variation of a magnetic field.

In an embodiment the sensor is configured on a leadframe as a micromodule with the sensor element and/or the signal processing electronics and/or a protection circuit and/or an interference suppression circuit. This embodiment is very economical, as the leadframe with the electronic components configured thereon can be injection-molded directly. In this case a separate sensor housing is dispensed with entirely, since the compressor casing also forms the sensor housing. If the compressor casing is formed from a plastics material, the micromodule also does not require separate electrical insulation because the electrical insulation of the sensor is also achieved through the plastics material of the compressor casing. In addition, according to this embodiment the sensor can be produced especially small, compact and inexpensive. The sensor in the form of a micromodule can also be used in other assemblies for measuring rotational speed—for example, in measuring the rotational speed of a wheel of a motor vehicle, the rotational speed of a camshaft in the engine or the rotational speed of a gear wheel. For this purpose the micromodule needs only to be injection-molded in the corresponding housing.

If the leadframe also forms the connector pins, a simple possibility of tapping the signals generated by the sensor is obtained.

In a development, a connecting cable is provided which is connected electrically at one end to the sensor and which is partially injection-molded integrally in the compressor casing. The molded-in connecting cable enables the signal of the sensor to be conducted to processing electronics in the vehicle, so that allowance can optimally be made for the usually very unfavorable space conditions in the region of the turbocharger. Furthermore, the plastics sheath which most cables have for electrical insulation can be injection-molded into the compressor casing in an outstandingly watertight and pollutant-tight manner.

BRIEF DESCRIPTION OF THE DRAWINGS

Embodiments of the invention are illustrated as examples in the figures, in which.

DETAILED DESCRIPTION OF THE PREFERRED EMBODIMENTS

Figure 1:
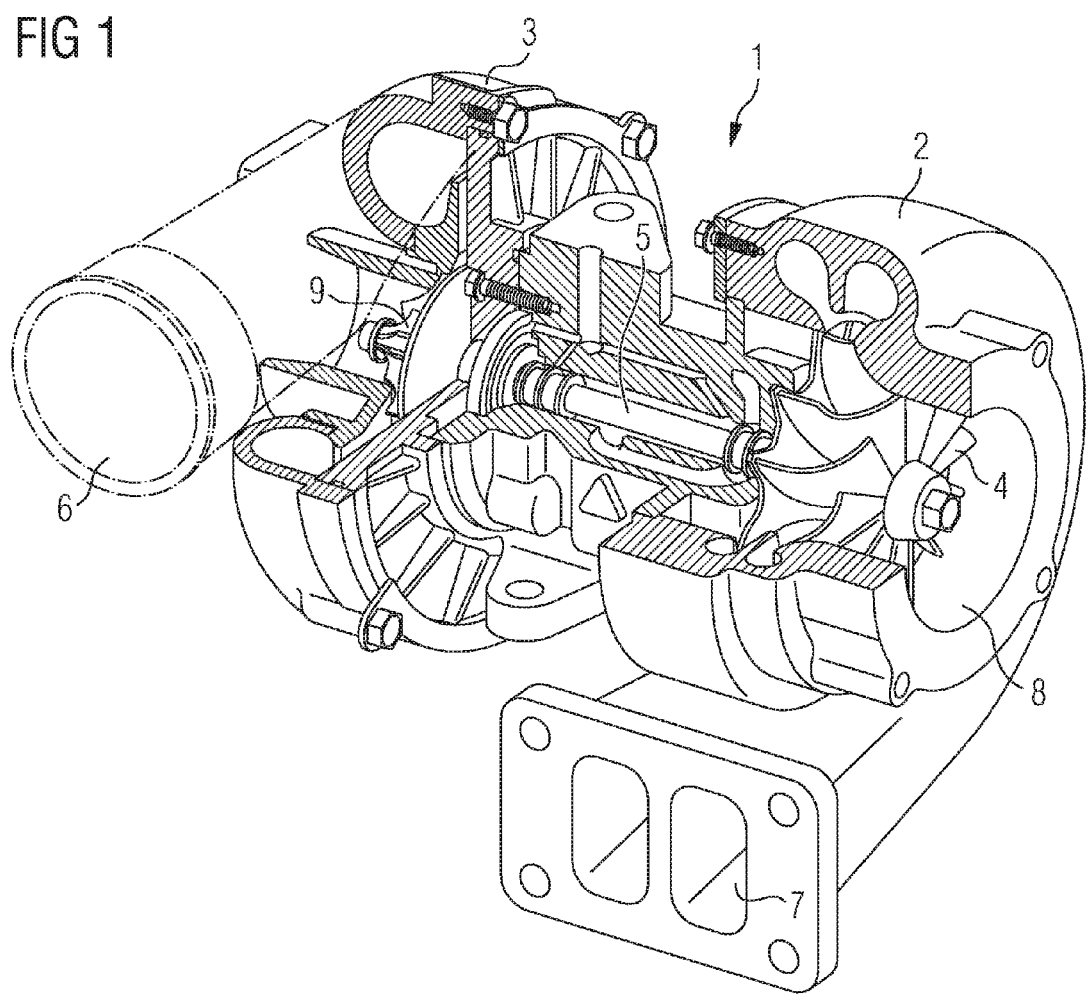
FIG. 1 shows a partially cut-out perspective view of an exhaust gas turbocharger.

FIG. 1 shows an exhaust gas turbocharger 1 with a turbine 2 and a compressor 3. The compressor wheel 9 is mounted rotatably in the compressor 3 and is connected to the turboshaft 5. The turboshaft 5 is also mounted rotatably and is connected at its other end to the turbine wheel 4. Hot exhaust gas from an internal combustion engine (not shown here) is admitted to the turbine 2 via the turbine inlet 7, the turbine wheel 4 being set in rotation. The exhaust gas flow leaves the turbine 2 through the turbine outlet 8. The turbine wheel 4 is connected to the compressor wheel 9 via the turboshaft 5. The turbine 2 thus drives the compressor 3. Air is aspirated into the compressor 3 through the air intake 10 and supplied via the air outlet 6 to an internal combustion engine (not shown here).

Figure 2:
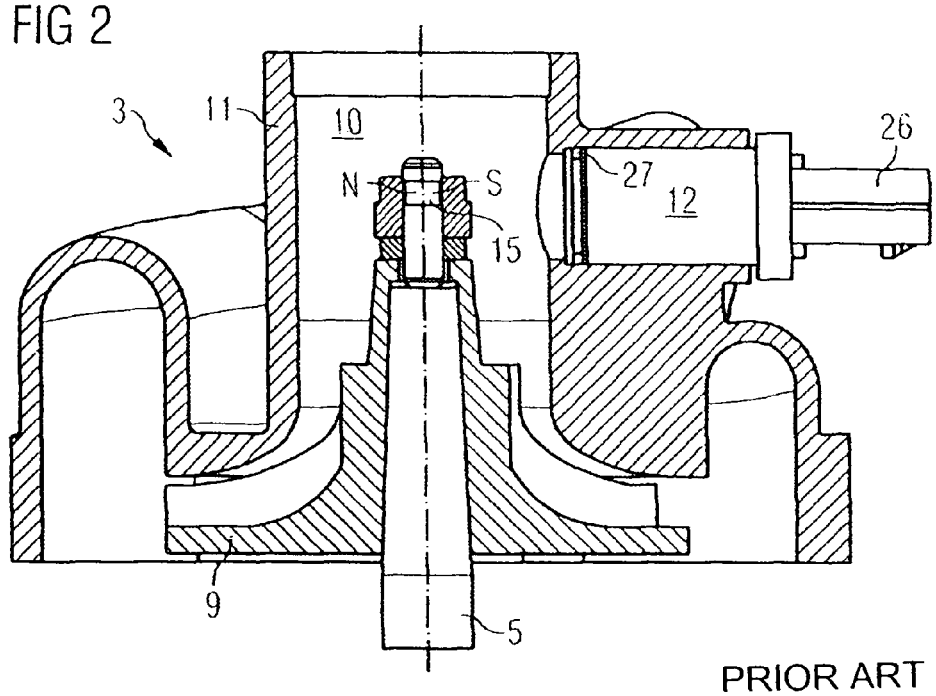
FIG. 2 shows a cross section view of an exhaust gas turbocharger with a sensor for measuring the rotational speed of the turboshaft according to the prior art.

FIG. 2 shows the compressor 3 of an exhaust gas turbocharger 1 with a sensor 12 for measuring the rotational speed of the turboshaft 5 according to the prior art. The exhaust gas turbocharger 1 includes a turboshaft 5 on which the compressor wheel 9 is arranged. Located in the compressor end of the turboshaft 5 is a magnet 15 which has a north pole N and a south pole S. Upon rotation of the turboshaft 5, rotation of the magnet 15 takes place, whereby the magnetic field generated by the north pole and south pole changes with respect to the sensor 12. According to the prior art the sensor 12 is arranged as a separate component in a recess in the compressor casing 11. For this purpose a seal 27 which seals the compressor casing 11 in the region of the sensor 12 is provided. Installation of the sensor 12 in the compressor casing 11 is relatively complex, because the compressor casing 11 is a relatively highly-stressed component thermally and mechanical stresses between the compressor casing 11 and the sensor 12 can occur as a result of different coefficients of thermal expansion. In addition, the installation of the sensor 12 in the compressor casing 11 is an additional work step in the manufacture of the exhaust gas turbocharger 1 which unnecessarily increases the cost thereof.

Figure 3:
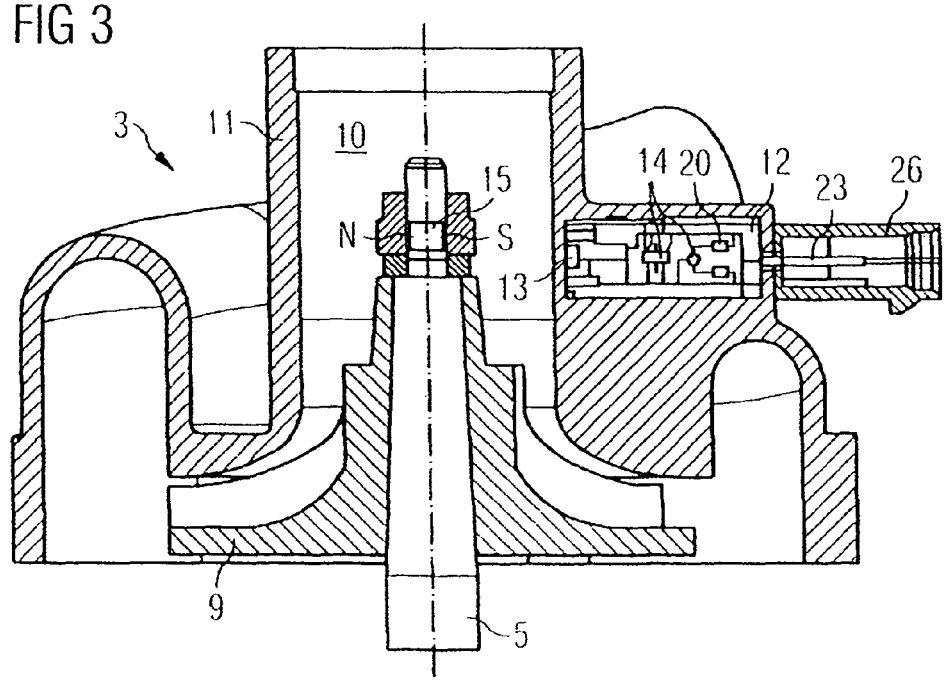
FIG. 3 shows a cross section view of an embodiment of the compressor casing according to the invention.

FIG. 3 shows an embodiment of the compressor casing 11 according to the invention. The compressor 3 of the exhaust gas turbocharger 1 again comprises the compressor casing 11, a turboshaft 5 and the compressor wheel 9 arranged thereon. The magnet 15 is arranged at the compressor end of the turboshaft 5 in the air intake 10. Upon rotation of the turboshaft 5 the north pole N and the south pole S rotate with the turboshaft 5. The resulting change of the magnetic field at the sensor 12 is detected by the sensor element 13. In this case the sensor 12 consists of a sensor element 13 and signal processing electronics 14, which are arranged on a leadframe 20 together with the sensor element 13. The sensor 12 thus formed is completely embedded in the material of the compressor casing 11. It can be clearly seen that the sensor 12 does not need to be installed subsequently in the compressor casing 11, but has been embedded in the compressor casing 11 in the injection-molding process during manufacture of the compressor casing 11, so that the sensor 12 is configured as an integral component of the compressor casing 11 itself. The compressor casing 11 may be produced using the injection-molding method, from plastics material, for example. Modern plastics materials are temperature-resistant to the extent that they are suitable for use as the compressor casing 11 for exhaust gas turbochargers 1. Furthermore, the compressor casing 11 may also be made from aluminum using the injection-molding method (also die-casting and precision casting). In order to integrate the sensor 12 in the aluminum compressor casing 11 it is possible to insulate the sensor element 13, the signal processing electronics 14 and the leadframe 20 electrically beforehand, in order to prevent electrical contact between these components and the aluminum compressor casing 11.

Figure 4:
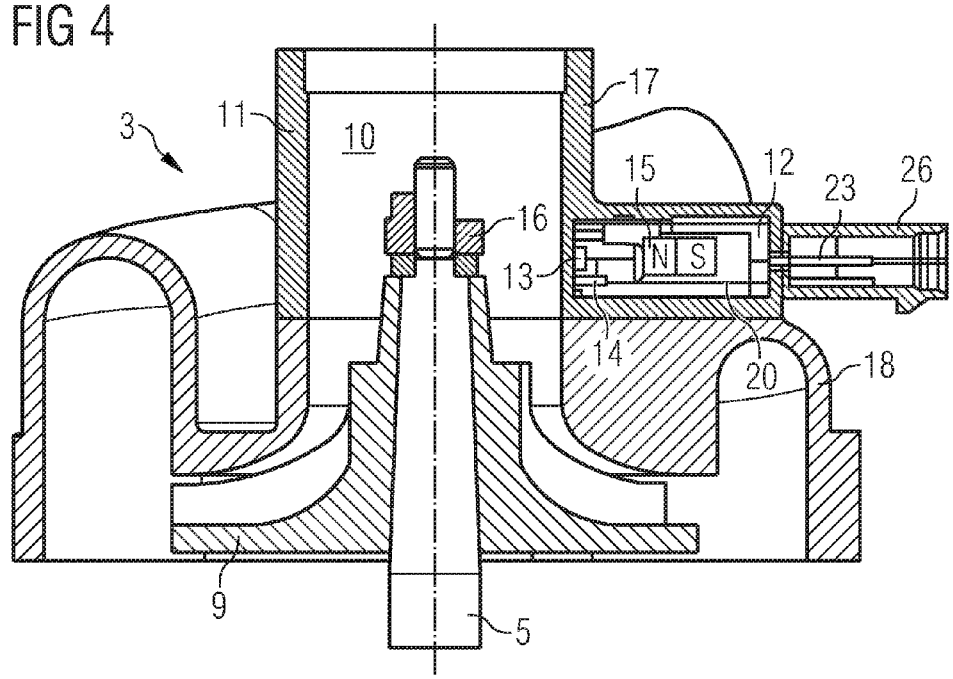
FIG. 4 shows a cross section of a further embodiment of the compressor casing according to the invention.

FIG. 4 shows a further embodiment of the inventive compressor casing 11, manufactured using the injection-molding method, with the sensor 12 for measuring the rotational speed of the turboshaft 5. Here the compressor casing 11 is formed in two parts. A first part 17 of the compressor casing 11 receives the sensor 12 as an integral component. In this case the sensor 12 comprises the sensor element 13, signal processing electronics 14 and the magnet 15. Here, too, the signal processing electronics 14 and the sensor element 13 are arranged on a leadframe 20. Furthermore, the magnet 15 may also be arranged on the leadframe 20. The leadframe 20 also forms the connector pins 23 which protrude from the compressor casing 11, a connector housing 26 for connecting the connector pins 23 to downstream electronics being formed in the region of the connector pins 23. The two-part configuration of the compressor casing 11 has the advantage that the most advantageous material can be selected both for the first part 17 of the compressor casing 11 and for the second part 18 of the compressor casing 11. It is possible, for example, for the first part 17 of the compressor casing 11 to be formed from a plastics material, while the second part 18 of the compressor casing 11 is produced from aluminum using an injection-molding method. The sensor 12 again forms an integral component of the compressor casing 11.

In this exemplary embodiment the magnet 15 is arranged with its north pole and its south pole in the sensor 12. The magnetic field generated by the magnet 15 flows through the sensor 13 and reaches an element 16 for varying the magnetic field. This magnetic field-varying element 16 may be in the form, for example, of a magnetically conductive body which rotates with the turboshaft 5 and is so formed that it collects the magnetic field in one position and dissipates it in another position. This change of the magnetic field takes place proportionally to the rotational speed of the turboshaft, because the magnetic field-varying element 16 rotates with the turboshaft 5. The change of the magnetic field is detected by the sensor element 13, which sends a rotational speed-proportional signal to the signal processing electronics 14.

Figure 5:
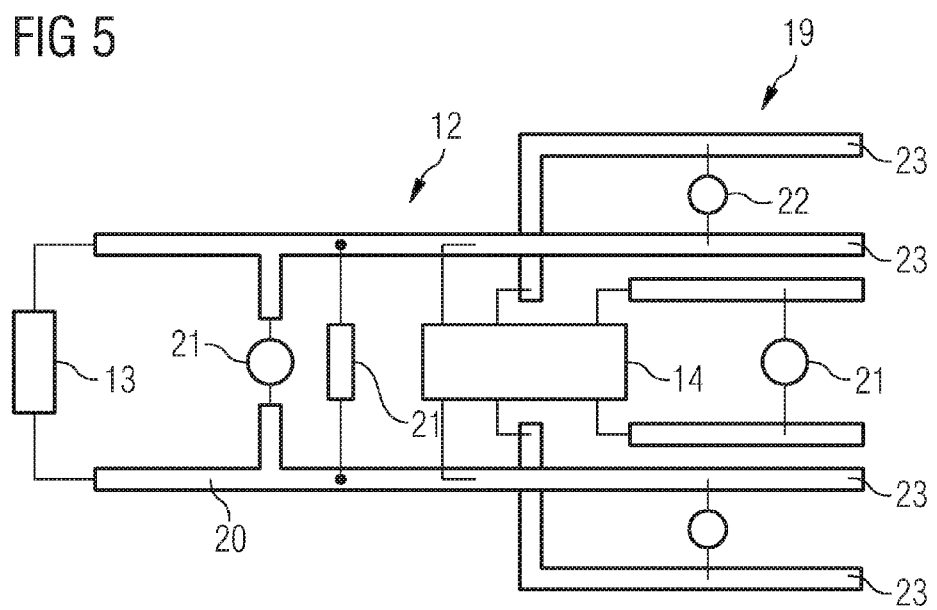
FIG. 5 shows a diagram of a sensor in the form of a micromodule.

FIG. 5 shows the sensor 12 in the form of a micromodule 19. Here the sensor 12 is built up on a leadframe 20, the leadframe 20 being fitted with a sensor element 13, a protective circuit 21, an interference suppression circuit 22 and signal processing electronics 14. The leadframe 20 is a punched sheet-metal part which mechanically supports the components just mentioned and connects them to one another electrically. In addition, the leadframe 20 forms the connector pins 23. The whole micromodule 19 can be encapsulated with an insulator for protection against electrically conductive contacts, for example, to the aluminum injection-molding of the compressor casing 11.

As an insulator, injectable polymers, for example, are possible. The micromodule 19 thus formed can be placed in an injection-molding tool which is used for producing the compressor casing 11. The sensor 12 in the form of the micromodule 19 is therefore injection-molded directly with the compressor casing 11 and becomes an integral component of the compressor casing 11.

FIG. 6 again shows the compressor 3 with the turboshaft 5 and the compressor wheel 9 arranged therein. A magnet 15 which generates a variable magnetic field in the sensor element 13 according to the rotational speed of the turboshaft 5 is again formed in the turboshaft 5. The sensor 12 with a sensor element 13, an interference suppression circuit 12 and signal processing electronics 14 is built up on a leadframe 20. Here, a connecting cable 24, which is connected electrically to the sensor 12 and which supplies the signals thereof to downstream motor vehicle electronics, is integrated in the compressor casing 11. One end of the connecting cable 24 is injection-molded integrally in the compressor casing 11. A strain-relief element 25, which can also serve as an anti-kink element, can also be seen. A connector housing 26 can be seen at the other end of the integrated connecting cable 24.

Figure 6:
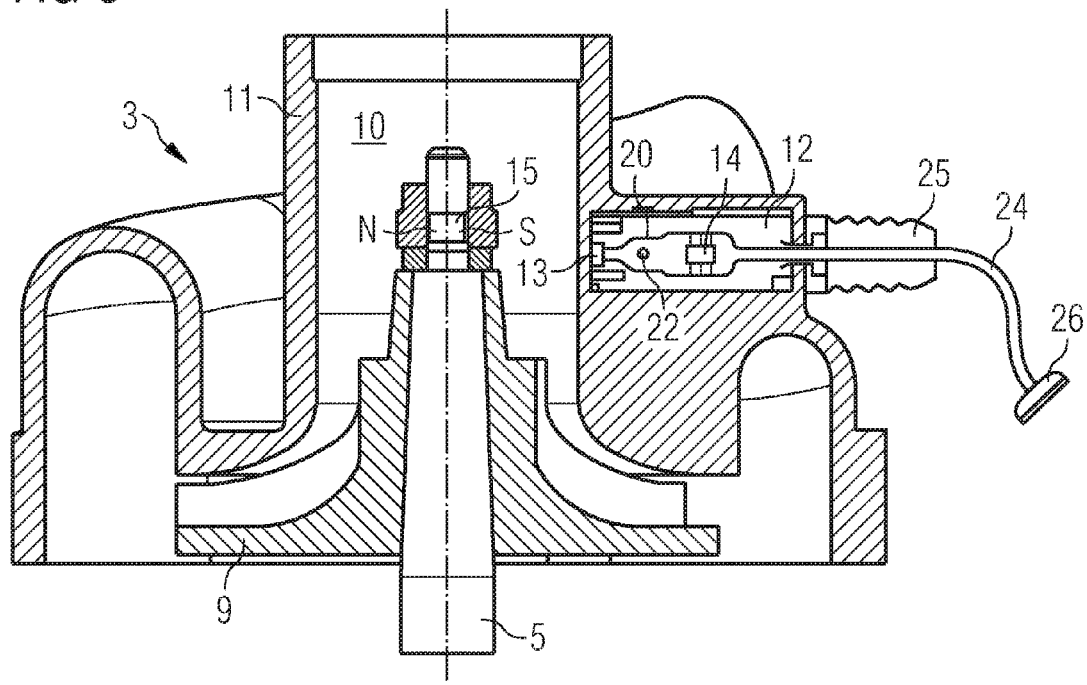
FIG. 6 shows a cross section view of a sensor with a connecting cable integrated in the compressor casing.

The turbocharger is as a rule installed in the motor vehicle in very space-restricted conditions, so that the configuration with the connecting cable 24 is very advantageous, since the signal generated by the sensor 12 can thereby be supplied without difficulty to downstream electronics. The connecting cable 24 can be laid optimally according to the circumstances. It should be noted that, as a result of the signal processing electronics 14, the raw signal generated by the sensor element 13 is already transmitted in preamplified form and possibly has been converted into a signal form which can be evaluated digitally, so that interference from outside cannot significantly influence the signal. The signal processing electronics 14 therefore make it possible to conduct the raw signal from the sensor element over a long distance in the vehicle interior without endangering the quality of the signal. The solution with the connecting cable 24 illustrated in FIG. 6 is therefore to be used, not exclusively but preferably, in combination with the signal processing electronics 14.

The integration of the sensor 20 in the compressor casing 11 gives rise to significant advantages regarding manufacture and construction, and advantages relating to the service life of the sensor 12 used here for measuring the rotational speed of the turboshaft 5. The molded-in sensor 12 is completely protected by the material of the compressor casing 11 against environmental influences such as spray water or salt mist which are met with on roads in wintry conditions. The sensor 12 is optimally sealed, so that seals, fitting clearances, and screwing and fixing points between the compressor casing 11 and the sensor 12 are completely dispensed with. The micromodule 19 is an assembly which can be used as a rotational speed sensor not only in the turbocharger 1 but also in other devices, again leading to cost savings, since this assembly can therefore be produced in very high volume. In addition, the advantageous saving of space, which is highly significant in the spatially cramped region of the engine compartment of modern motor vehicles, should be mentioned.

What is claimed is:

1. A compressor casing for an exhaust gas turbocharger comprising a rotatable turboshaft, a compressor wheel mounted on the turboshaft, and a turbine wheel mounted on the turboshaft, the compressor casing comprising:
a sensor for measuring a rotational speed of the turboshaft, wherein the sensor is fully enclosed by an injected material that forms the compressor casing during an injection molding process so that the sensor is embedded in the compressor casing during formation of the compressor casing, and thereby forms an integral component of the compressor casing.

2. The compressor casing of claim 1, wherein the compressor casing is produced by an injection-molding method.

3. The compressor casing of claim 1, wherein the compressor casing comprises a plastic material.

4. The compressor casing of claim 1, wherein the compressor casing comprises aluminum.

5. The compressor casing of claim 1, wherein the compressor casing comprises a first part and a second part.

6. The compressor casing of claim 5, wherein the first part comprises aluminum or a plastic material.

7. The compressor casing of claim 5, wherein the second part comprises aluminum or a plastic material.

8. The compressor casing of claim 1, wherein the sensor comprises at least one of a sensor element, signal processing electronics, and a magnet.

9. The compressor casing of claim 8, wherein the sensor element comprises a Hall sensor element.

10. The compressor casing of claim 8, wherein the sensor element comprises a magneto-resistive sensor element.

11. The compressor casing of claim 8, wherein the sensor element comprises an inductive sensor element.

12. The compressor casing of claim 1, wherein the sensor comprises a sensor element and at least one of signal processing electronics, a protection circuit and an interference suppression circuit, the sensor being configured on a leadframe as a micromodule.

13. The compressor casing of claim 12, wherein the leadframe comprises connector pins.

14. The compressor casing of claim 8, further comprising a connecting cable which is connected electrically at one end to the sensor, part of the connecting cable forms an integral component of the compressor casing.

15. The compressor casing of claim 1, wherein the casing is arranged between the sensor and an interior space of the compressor casing configured to encase one or more of the rotatable turboshaft, the compressor wheel mounted on the turboshaft, and the turbine wheel mounted on the turboshaft.

16. The compressor casing of claim 14, wherein the casing is molded onto the cables connected to the sensor.

17. A method for producing a compressor casing for an exhaust gas turbocharger comprising a rotatable turboshaft, a compressor wheel mounted on the turboshaft, and a turbine wheel mounted on the turboshaft, the method comprising the steps of:
placing a sensor for measuring a rotational speed of the turboshaft in an injection-molding tool for the compressor casing; and
injecting a material for the compressor casing in the injection-molding tool so that the sensor is enclosed by the injected material, whereby the sensor is configured as an integral component of the injection-molded compressor casing.

* * * * *